United States Patent
Watanabe et al.

[11] Patent Number: 5,875,745
[45] Date of Patent: Mar. 2, 1999

[54] ENGINE THROTTLE CONTROL

[75] Inventors: Hitoshi Watanabe; Masanori Takahashi, both of Hamamatsu, Japan

[73] Assignee: Sanshin Kogyo Kabushiki Kaisha, Japan

[21] Appl. No.: 823,045

[22] Filed: Mar. 21, 1997

[30] Foreign Application Priority Data

Mar. 21, 1996 [JP] Japan .................................... 8-093381

[51] Int. Cl.[6] .................................................. F02B 29/02
[52] U.S. Cl. ............................................................. 123/59.5
[58] Field of Search .................................. 123/432, 59.5, 123/579, 580, 583

[56] References Cited

U.S. PATENT DOCUMENTS

| | | |
|---|---|---|
| 3,030,819 | 4/1962 | Edelbrock, Jr. . |
| 3,035,601 | 5/1962 | Moseley . |
| 4,261,304 | 4/1981 | Yamada .................................. 123/59.5 |
| 4,319,553 | 3/1982 | Endo ....................................... 123/59.5 |
| 4,441,464 | 4/1984 | Toyoda et al. .......................... 123/59.5 |
| 4,632,082 | 12/1986 | Hattori et al. . |
| 4,688,533 | 8/1987 | Otobe . |
| 4,702,202 | 10/1987 | Hensel et al. . |
| 4,823,748 | 4/1989 | Ampferer et al. . |
| 4,864,996 | 9/1989 | Hensel . |
| 4,903,648 | 2/1990 | Lassankse . |
| 4,938,191 | 7/1990 | Oldani et al. ........................... 123/432 |
| 4,971,006 | 11/1990 | Imaeda . |
| 4,995,370 | 2/1991 | Imaeda et al. . |
| 5,036,806 | 8/1991 | Yamamoto et al. .................... 123/59.5 |
| 5,326,293 | 7/1994 | Shishido et al. . |
| 5,394,846 | 3/1995 | Jaeger et al. . |
| 5,517,963 | 5/1996 | Yoshida et al. . |
| 5,517,977 | 5/1996 | Nakai et al. . |
| 5,524,596 | 6/1996 | Nakai et al. . |
| 5,535,718 | 7/1996 | Nakai et al. . |

FOREIGN PATENT DOCUMENTS

2-119947  9/1990  Japan .

Primary Examiner—Marguerite McMahon
Attorney, Agent, or Firm—Knobbe, Martens, Olson & Bear, LLP

[57] ABSTRACT

An engine includes an improved throttle control to enhance engine performance. The throttle valves within the engine are arranged to rotate about an axis with is generally parallel to a direction in which a distance between intake branch passages increases as the intake branch passages diverge apart. The uniformity of the amount of air delivered to each branch passage is thus improved to produce more complete and consistent combustion within the respective combustion chamber. In addition, the pitch between the throttle valves as arranged on the engine generally matches the pitch between the cylinders of the engine in order to standardize the length and shape of the induction paths from the throttle valves to the respective cylinder. Improved consistency between the cylinders of the amount of air charge delivered to each cylinder results from this arrangement.

16 Claims, 5 Drawing Sheets

ENGINE THROTTLE CONTROL

BACKGROUND OF THE INVENTION

1. Field of the Invention

The present invention relates in general to an engine for an watercraft. In particular, the present invention relates to a throttle control device for a marine engine.

2. Description of Related Art

An in-line four-cycle engine often powers an outboard motor today in view of emission concerns in the industry. Such an engine includes a plurality of cylinders formed within a cylinder block. The cylinders are arranged above one another along parallel horizontal axes that lie within a common plane. Pistons reciprocate within the cylinders and drive a crankshaft that rotates about a vertical axis.

A cylinder head is attached to an end of the cylinder block. Intake passages are formed within the cylinder head and communicate with the cylinders. In engines employing multiple intake valves, each intake passage diverges into branch passages that communicate with the respective cylinder. These branch passages often are positioned above one another such that the branches diverge to increase a distance between the branch passages in a direction that is generally parallel to the vertical axis about which the crankshaft rotates.

A plurality of butterfly throttle valves typically regulate the amount of air delivered to each cylinder of the engine. The valve disc of each valve is supported within the valve body by a throttle shaft. The throttle valves commonly are arranged on a side of the engine above one another. The throttle valves are all positioned such that such that throttle shafts lie parallel to each other with the throttle valves rotating about an axis that is perpendicular to the rotational axis of the crankshaft.

A throttle linkage commonly interconnects the throttle shafts of the throttle valves. The linkage generally synchronizes the operation of the throttle valves to stabilize engine rotation. The amount of air delivered to the respective cylinder depends upon the opening angle control by the linkage system.

The throttle linkage commonly includes a series of aligned throttle rods which operate a plurality of throttle levers. One end of the throttle lever is connected to the throttle shaft. The levers are placed parallel to one another, and the series of linkage rods join together the outer ends of the levers. Conventional clips connect the linkage rods to the levers.

Prior induction system designs suffer from several shortcomings. For instance, temperature changes often effect the control of the throttle valves. With increased temperature, prior linkage designs thermally expand which causes the positions of the throttle shafts and the corresponding throttle valve to become unsynchronized. For instance, where a linkage rod connects to a relatively fixed first throttle lever at one end and a movable second throttle lever at the other end, thermal expansion of the linkage rod will move the second lever relative to the first lever. The second lever therefore will no longer lie parallel to the first lever, and consequently the corresponding angle of the second throttle valve, which is operated by the second throttle lever, will differ from the angle of the first throttle valve. Thermal expansion of the linkage rod thus unsynchronizes the operation of the first and second throttle valves.

The arrangement of the linkage rods in series compounds this problem. The increased length of each throttle rod stacks up so that the lever operating the last throttle valve typically moves by an amount corresponding to the combined length increase of each throttle rod within the series. The angles of the first and last throttle valves thus can greatly differ so the operation of the charge formers are no longer synchronized and engine revolution becomes unstabilized. When this occurs at low revolution speed (i.e., under idling conditions) the engine can stall.

In addition, when the throttle valves are slightly opened, more air flows over an upper edge of the throttle valve than over a lower edge of the valve. A greater volume of air thus is directed to the upper branch passage than to the lower branch passage. This uneven air flow through the throttle device also causes a richer fuel/air charge to flow into the lower branch passage and lower intake port than through the upper branch passage and upper intake port. Inconsistent combustion consequently results in the respective combustion chamber, degrading engine performance.

The spacing or pitch between the central axes of each cylinder and the spacing or pitch between the center of the throttle valves also are conventionally different within the engine. The induction paths from the throttle valves to the respective cylinders consequently have differing shapes and lengths from one another. The same amount of air therefore is not delivered to each cylinder. This inconsistency produces a power differential between the cylinders, impairing the engine's performance.

SUMMARY OF THE INVENTION

A need therefore exists for an improved induction system for an engine of an marine drive which improves the distribution of the air charge within each cylinder, as well as increases the consistency between cylinders of the amount of air delivered to each cylinder.

One aspect of the present invention thus involves an engine for a marine drive. The engine comprises a plurality of variable-volume chambers. At least one movable member is mounted within each variable-volume chamber and drivingly connects to an output shaft. The output shaft rotates about a rotational axis when driven by the movable members. A plurality of throttle device are arranged on the engine such that each throttle device communicates with one of the variable-volume chambers. The throttle devices each include a throttle valve which rotates about an axis that is generally parallel to the rotational axis of the output shaft.

Another aspect of the present invention involves an engine for a marine drive comprising at least two cylinders. The cylinders are arranged with their axes being generally parallel to each other within generally the same plane. At least two throttle devices are arranged on the engine such that each throttle device communicates with one of the cylinders. The throttle devices are spaced apart from each other by a pitch that generally equals a pitch between the cylinder axes.

In accordance with an additional aspect of the present invention, an engine for a marine drive is provided. The engine comprises a plurality of throttle devices. Each throttle device includes an operator shaft to actuate the throttle device. The throttle devices are arranged within the engine to position the operator shafts in series along a common axis. A linkage is formed by the series of operator shafts with the adjacent ends of each neighboring pair of operator shafts being connected by a coupler.

BRIEF DESCRIPTION OF THE DRAWINGS

These and other features of the invention will now be described with reference to the drawings of a preferred embodiment which is intended to illustrate and not to limit the invention, and in which.

DETAILED DESCRIPTION OF THE PREFERRED EMBODIMENT

Figure 1:
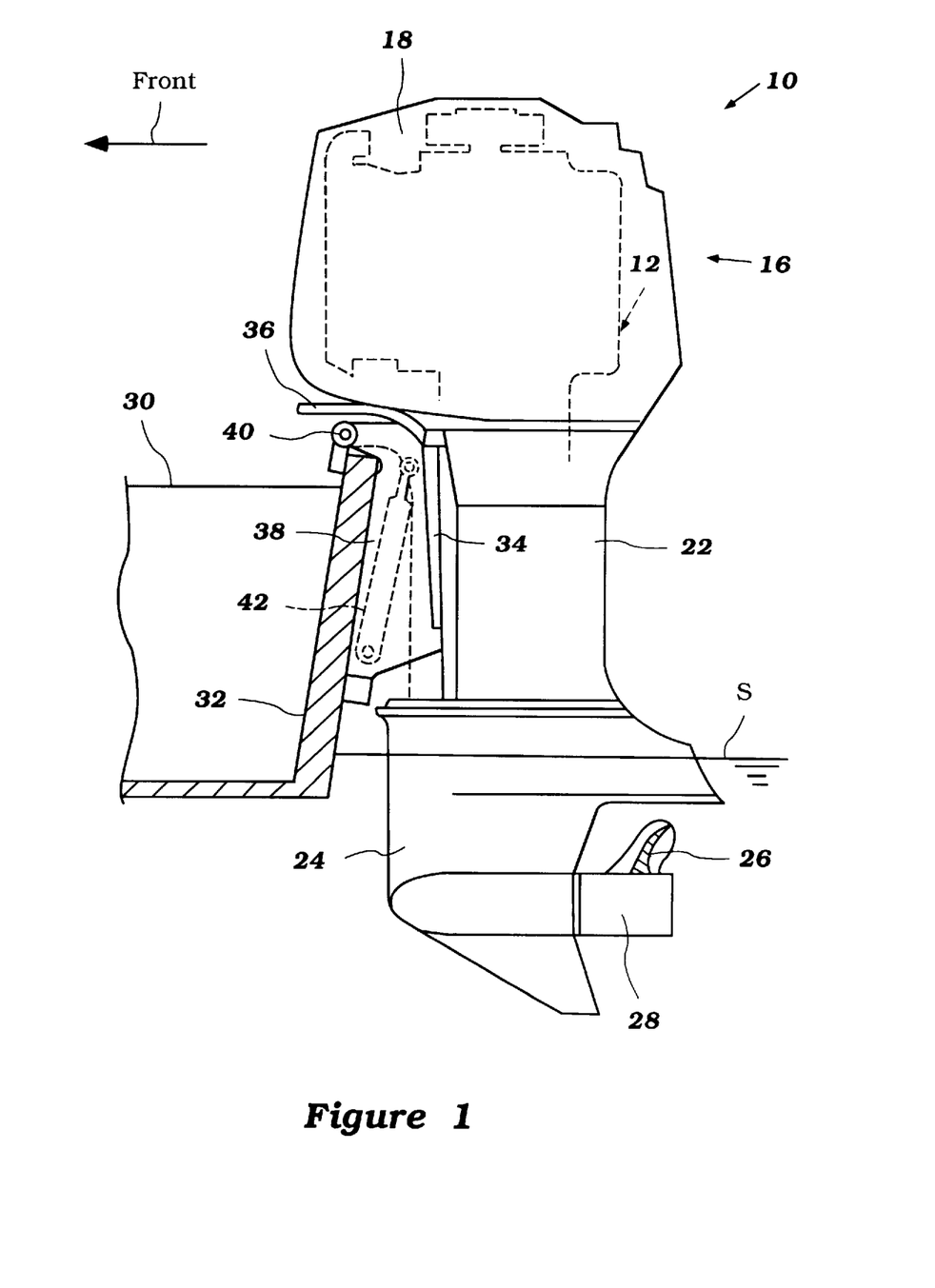
FIG. 1 is a side elevational view of an outboard motor that employs an engine, shown in phantom, which incorporates a throttle control device configured in accordance with a preferred embodiment of the present invention.

FIG. 1 illustrates a marine drive 10 which incorporates an engine 12 having an induction system 14 configured in accordance with a preferred embodiment of the present invention. The present induction system 14 has particular utility with an outboard motor, and thus, it is described below in connection with such a drive. However, the description of the invention in conjunction with the illustrated outboard motor is merely exemplary. The present induction system can be used with engines used in inboard motors, inboard/outboard motors, and the like as well.

The outboard motor 10 has a powerhead 16 that includes the internal combustion engine 12. A protective cowling 18 surrounds the engine 12.

As is typical with the outboard practice, the engine 12 is supported within the powerhead 16 so that is output shaft 18 (i.e., crankshaft in the illustrated embodiment) rotates about a generally vertical axis 20. The crankshaft 18 is coupled to a drive shaft that depends through and is journalled within a drive shaft housing 22.

The drive shaft housing 22 extends downward from the cowling 18 and terminates at a lower unit 24. The drive shaft extends into the lower unit 24 to drive a transmission housed within the lower unit 24. The transmission selectively establishes a drive condition of a propulsion device 26. In particular, the transmission selectively couples the drive shaft to at least one propulsion shaft 28 that drives the propulsion device 26. The transmission desirably is a forward/neutral/reverse-type transmission so as to drive the associated watercraft 30 in any of these operational states.

In the illustrated embodiment, the propulsion shaft 28 lies at about a 90 degree shaft angle relative to the drive shaft. The propulsion shaft 28 extends rearward from the transmission and through a rear wall of the lower unit 24. The propulsion device 26 is attached to and supported by the rear end of the propulsion shaft 28.

The propulsion device 26 in the illustrated embodiment is a propeller that has a plurality of propeller blades radiating from a propeller hub. This embodiment of the propulsion device is merely exemplary, however. The present engine 12 can be used with other types of propulsion devices, such as, for example, but without limitation, counter-rotating dual propeller systems, jet pumps, and the like.

The outboard motor 10 is attached to a transom 32 of the watercraft in a manner permitting the motor 10 to swivel relative to the watercraft's transom 32. For this purpose, a steering shaft is affixed to the drive shaft housing by upper and lower brackets. The brackets support the steering shaft for steering movement within a swivel bracket 34. The steering movement occurs about a generally vertical steering axis which extends through the steering shaft. A steering arm 36 is connected to an upper end of the steering shaft and extends in a forward direction for manual steering of the outboard motor, as known in the art.

The swivel bracket 34 also is pivotally connected to a clamping bracket 38 by a pin 40. The clamping bracket 38, in turn, is configured to attach to the transom 32 at a location which supports the outboard motor 10 in a position designed to place the propeller 26 beneath the surface level S of the body of water in which the watercraft 30 is operated.

The conventional coupling between the swivel bracket 34 and the clamping bracket 38 permits adjustment of the trim position of the outboard motor 10, as well as allows for the outboard motor 10 to be tilted up for transportation or storage. For this purpose, a conventional tilt and trim cylinder assembly 42 operates between the swivel and clamping brackets 34, 38 to raise and lower the outboard motor 10 by rotating the swivel bracket 34 about the support pin 40.

The construction of the outboard motor 10 as thus far described is considered to be conventional, and for that reason further details of the construction are not believed necessary to permit those skilled in the art to understand and practice the present invention. A detailed description of the engine 12 and the present induction system 14 will now follow.

The engine 12 is, in the illustrated embodiment, a reciprocating multi-cylinder engine operating on a four-stroke principle. In the illustrated embodiment, the engine has four cylinders 44 arranged an in-line configuration; though it will be readily apparent to those skilled in the art how the invention may be utilized with engines having other cylinder arrangements and other number of cylinders.

Figure 2:
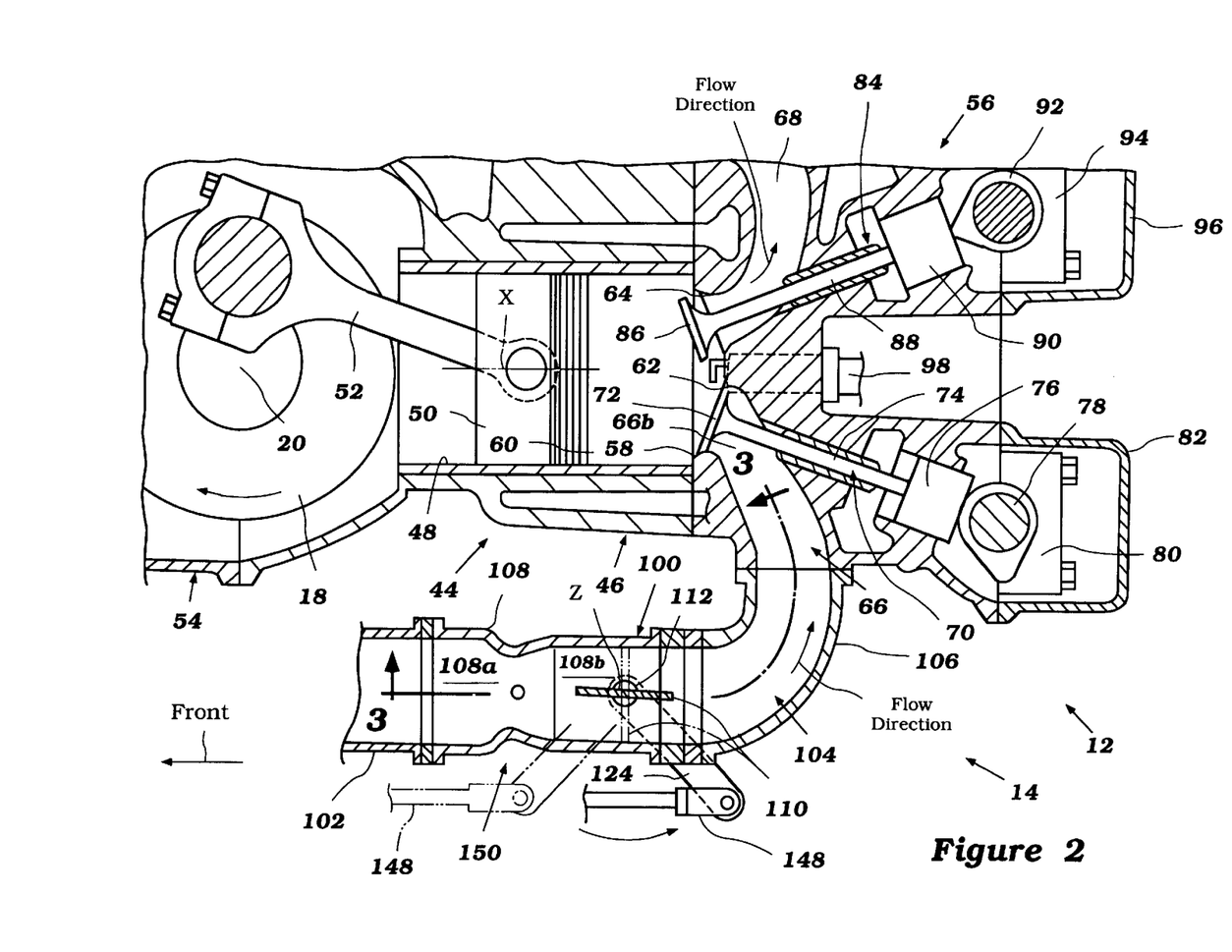
FIG. 2 is a partial cross-sectional view of the engine of FIG. 1 taken along line 2—2.

As best understood from FIG. 2, the engine 12 includes a cylinder block 46 which desirably defines four cylinder bores 48 that have their axes X lying on different horizontal planes, yet lying in a common vertical plane. The axes X of the cylinder 44 lie generally transverse to the rotational axis 20 of the crankshaft 18, which also lies in the same vertical plane.

A piston 50 reciprocates within each bore 48 while a connecting rod 52 links the piston 50 to a corresponding throw of the crankshaft 18, which is offset from the crankshaft rotational axis 20. As a result, the reciprocal linear movement of the pistons 50 within the respective bores rotates the crankshaft 18.

The crankshaft 18 is journalled for rotation within a crankcase 54 formed at one side of the engine 12 (e.g., on the front side of the outboard motor 10 in the illustrated embodiment). The crankcase 54 is formed by a crankcase member attached to an end of the cylinder block 46. In the illustrated embodiment, the cylinder block 46 is formed with a skirt to which the crankcase member is bolted.

A cylinder head assembly 56 is attached on the opposite end of the cylinder block 46. An inner face of the cylinder head 56 defines a plurality of recesses 58 that correspond in diameter size and spacing on the cylinder head 56 to the cylinder bores 48 of the cylinder block 46. Each recess 58 is arranged over an end of the cylinder bore 48 to close the end of the respective cylinder 44. The corresponding cylinder bore 48, piston 50 and cylinder head recess 58 of each cylinder 44 form a variable-volume chamber 60, which at minimum volume, defines a combustion chamber.

At least two intake ports 62 and at least one and preferably two exhaust ports 64 are formed at the surface of each recess 58. The intake ports 62 desirably are formed to one side of the longitudinal axis X of the respective cylinder 44 and are arranged such that one intake port 62 is positioned on the surface of the recess 58 above the other intake port 62.

The cylinder head 56 also defines a plurality of intake passages 66. As best understood from FIG. 3, the cylinder head defines a common passage 66a which divides into two branch passage 66b, 66c for each cylinder 44 of the engine 12. The spacing P between the central axes of adjacent common passages 66a desirably matches the distance between axes X of the corresponding adjacent cylinder bores 44.

Figure 3:
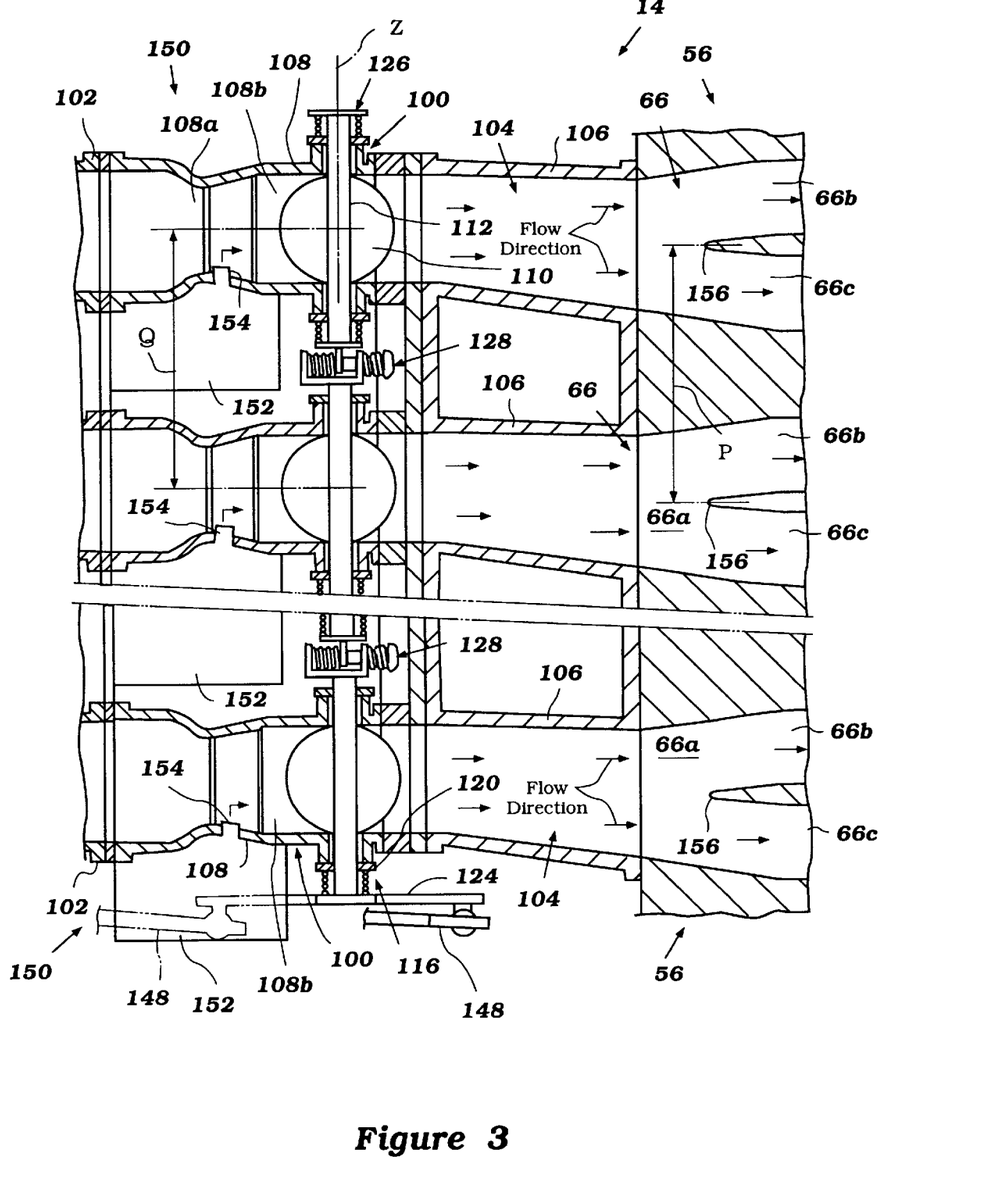
FIG. 3 is a schematic sectional view of an induction system of the engine of FIG. 2 as viewed along line 3—3.

The branch passages 66b, 66c diverge such that an upper branch passage 66b connects to the cylinder chamber 60 through the upper intake port 62, and a lower branch passage 66c connects to the cylinder chamber through the lower intake port 62. For this purpose, the branch passage 66b, 66c diverge generally in the vertical direction, i.e., in a direction parallel to the rotational axis 20 of the crankshaft 18.

One or more exhaust passages 68 for each cylinder recess 58 also extend through the cylinder head 56. In the illustrated embodiment, the exhaust passages 68 lie on a side of the cylinder head 56 opposite of the intake passages 66. Each exhaust passage 68 communicates with a respective one of the exhaust ports 64 of the cylinders 44. An outlet end of the exhaust passage 68 communicates with an exhaust manifold of a conventional exhaust system. The exhaust system discharges exhaust gases from the engine's combustion chambers 60 in a conventional manner.

The peripheral edge of each intake and exhaust port 62, 64 forms a valve seat. The valve seat cooperates with a corresponding valve that regulates either the ingress or egress of fluid flow through the corresponding port.

In connection with each cylinder 44, a pair of intake valves 70 control the opening and closing of the intake ports 62. Each intake valve 70 includes a head portion 72 that cooperates with the respective valve seat of each intake port 62 and a stem portion 74 that is supported for reciprocation within an intake valve guide pressed into the cylinder head 56. Although not shown for simplification of the drawing, a coil compression spring encircles the valve stem 74 of each intake valve 70 and bears against the cylinder head 56 and a keeper retainer assembly, which is fixed of an upper end of the valve stem, for urging the intake valve 70 toward a closed position.

Thimble type tappets 76 are slidably supported within the cylinder head 56. Each tappet 76 cooperates with an upper end of the valve stem 74. An intake camshaft 78 actuates the tappets 76 to open and close the associated intake valves 70 in a known manner.

The cylinder head 56 supports the intake camshaft 78 adjacent to the row of tappets 76. The intake camshaft 78 is arranged to rotate about a generally vertical axis, parallel to the rotational axis 20 of the crankshaft 18. Bearing caps 80 and corresponding bearing webs on the cylinder head 56 journal the camshaft 77 for such rotation.

A cam cover 82 is attached to the cylinder head 56 on the side of the cylinder head 56 opposite the cylinder block 46. The camshaft 78 operates within a cam chamber formed between the cylinder head 56 and the cam cover 82.

An exhaust valve 84 controls the opening and closing of the corresponding exhaust port 64. Each exhaust valve 84 includes a head portion 86 that cooperates with the respective valve seat 64 and a stem portion 88 that is supported for reciprocation within an intake valve guide pressed into the cylinder head 56. Similar to the intake valves 70, a coil compression spring encircles the valve stem 88 of each exhaust valve 84 and bears against the cylinder head 56 and a keeper retainer assembly for urging the exhaust valve 84 toward a closed position.

Thimble-type tappets 90 are slidably supported within the cylinder head 56. Each tappet 90 cooperates with an upper end of the valve stem 88 of the respective exhaust valve 84. An exhaust camshaft 92 actuates the tappets 90 to open and close the associated exhaust valves 84 in a known manner.

The cylinder head 56 supports the exhaust camshaft 92 adjacent to the row of exhaust port tappets 90. The exhaust camshaft 92 is arranged to rotate about a generally vertical axis, parallel to the intake camshaft 78 and the rotational axis 20 of the crankshaft 18. Bearing caps 94 and corresponding bearing webs on the cylinder head 56 journal the camshaft 92 for such rotation. A second cam cover 96 is attached to the cylinder head 56 over the bearing caps 94 to enclose the exhaust camshaft 92 within a cam chamber formed between the cylinder head 56 and the second cam cover 96.

Each combustion chamber 60 of the engine 12 is provided with a single spark plug 98 for firing a charge therein. As seen in FIG. 2, a spark plug 98 is releasably mounted within a tapped mounting hole within the cylinder head 56. A spark gap of the spark plug 98 extends into the combustion chamber 60 and is located generally at the center of the recess surface 58 between the intake and exhaust ports 62, 64. Thus, in FIG. 2, the spark gap lies behind the illustrated intake and exhaust ports 62, 64. A suitable ignition system (not shown), which is desirably electronically controlled, fires the spark plug 98 in accordance with a known firing sequence and timing schedule.

Because the invention deals primarily with the induction system 14 of the engine 12, it is not believed necessary to discuss or describe the particular ignition system or valve operation mechanism of the engine 12 in further detail. The present induction system 14 will now be described.

The induction system 14 includes at least one, and desirably a plurality of throttle devices 100. In the illustrated embodiment, each throttle device 100 is dedicated to a respective cylinder 44 and arranged on the side of the engine 12. The throttle devices 100 desirably are spaced apart from one another by a distance Q (i.e., pitch) which equals the distance P between adjacent cylinders 44, as shown in FIG. 3.

Each throttle device 100 is connected to an induction pipe 102 at its inlet end. The induction pipe 102 in turn extends between the throttle device 100 and an air intake device (not shown), such as, for example, a filtered surge tank mounted at the crankcase end of the engine 12.

The outlet ends of the throttle devices 100 are connected to a intake manifold 104. In the illustrated embodiment, the intake manifold 104 includes a plurality of runners 106. Each runner 106 connects one of the throttle devices 100 to a respective intake passage 66 within the cylinder head 56.

As best seen in FIG. 3, the runners 106 have generally equal lengths and shapes due to the similar spacing P, Q between the cylinders 44 and the between the throttle devices 100. The lengths of the intake passages 66 also are generally equal. As a result of the induction path from the throttle device 100 to the combustion chamber 60 being generally uniform between the cylinders 44, the volume of air delivered to each cylinder 44 during a combustion cycle is substantially the same for each cylinder 44, which improves engine performance.

As seen in FIGS. 2 and 3, the illustrated throttle device 100 includes a throttle body 108 that defines a venturi section 108a and a throat section 108b. A butterfly-type valve 110 operates within the throttle body throat section 108b to rotate between an wide open position and a closed position.

A throttle shaft 112 supports the throttle valve 110 within the throat section 108b. An axis Z of the throttle shaft 112, which defines the rotational axis of the throttle valve 110, is arranged to lie at the center of the flow path through the throat section 108b and generally in a vertical direction, parallel to the crankshaft axis 20. In the illustrated embodiment, the throttle shafts 112 are aligned along a common generally vertical axis Z. Rotation of each throttle shafts 112 rotates the throttle valve 110 within the respect throat 108b to regulate air flow through the throat 108b.

Figure 4:
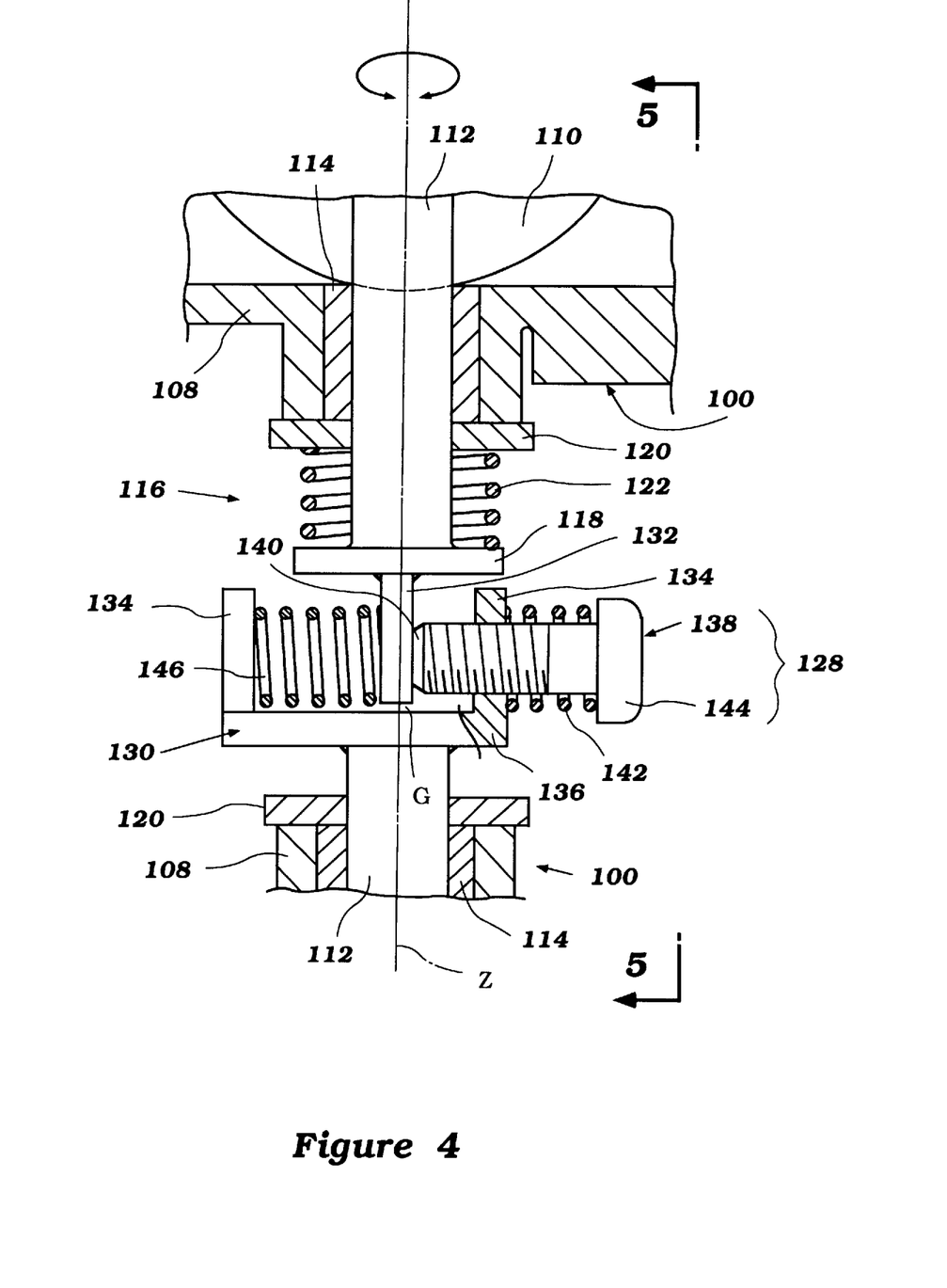
FIG. 4 is an enlarged sectional view of a coupling between throttle shafts of the induction system of FIG. 3.

As best understood from FIG. 4, each throttle shaft 112 is journalled within the respective throttle body 108 by a pair of bushings 114. The bushings 114 of the pair lie on diametrically opposite sides of the throat section 108b.

Figure 5:
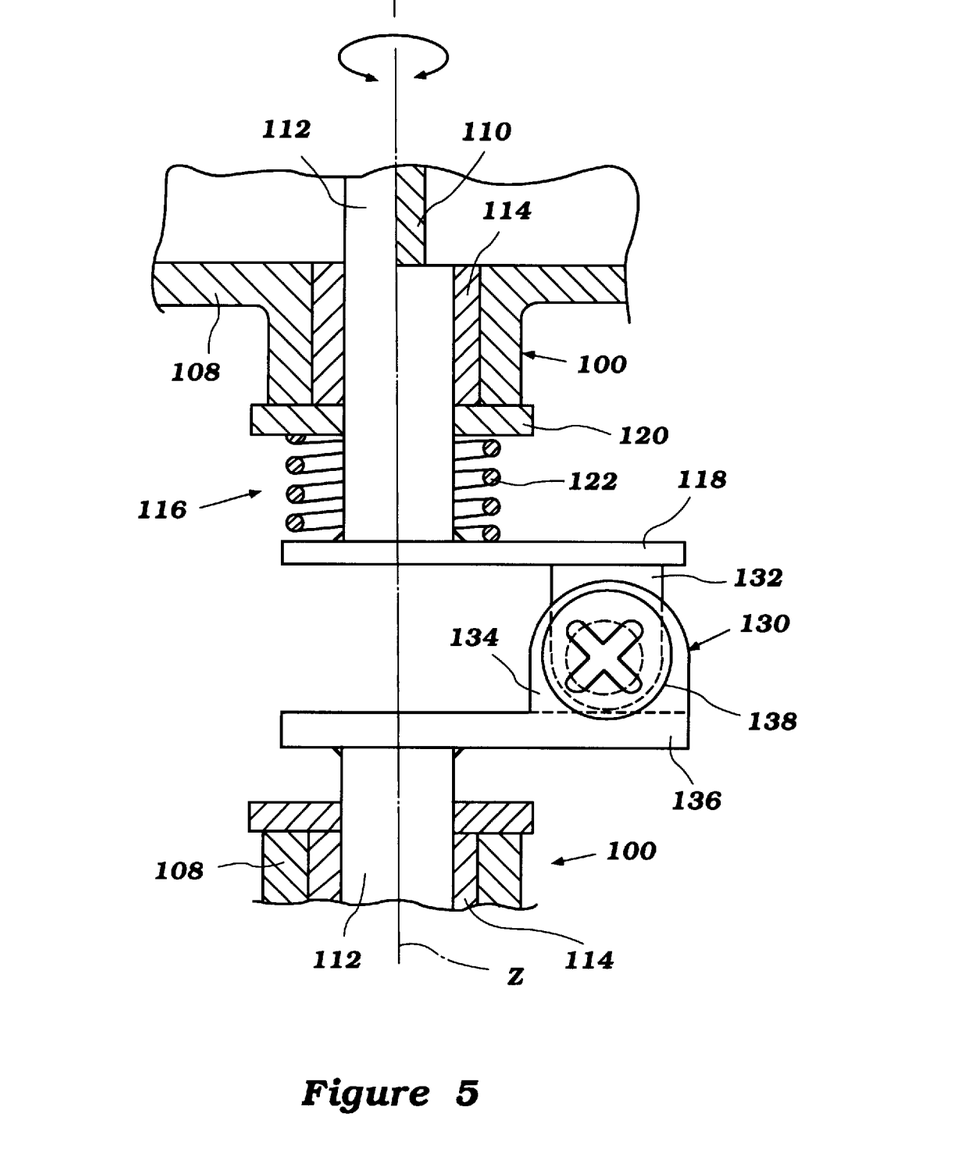
FIG. 5 is an enlarged sectional view of the coupling of FIG. 4 as viewed in the direction of line 5—5.

A biasing mechanism 116 desirably biases each throttle valve 110 toward the closed position. In the illustrated embodiment, the biasing mechanism 116 involves an end plate 118 mounted to an end of the throttle shaft 112 and a cap washer 120 attached to the throttle body 108. The throttle shaft 112 extends through the cap washer 120. The end plate 118 thus lies distal of the cap washer 120 relative to the throttle body 108. As best seen in FIG. 5, the end plate 118 extends well to one side of the common axis Z of the throttle shafts 112, for reasons described below.

A torsion spring 122 operates between the cap washer 120 and the end plate 118 with the respective ends of the spring 12 connected to the washer 120 and the plate 118. The spring 122 produces a biasing force as the throttle shaft 112 rotates relative to the throttle body 108 from the closed position to the open position.

As best seen in FIG. 3, the end plate on the throttle shaft 112 of the lowermost throttle device 100 is a lever 124 which extends outward from the throttle body 108. The corresponding biasing mechanism 116 operates between the lever 124 and the respective cap washer 120 to bias the lever 124 toward the closed position, as shown in phantom in FIG. 2. On the other end of the array of throttle devices 100, the upper end of the uppermost throttle shaft 112 is secured to the respective throttle body by a suitable coupling 126.

The throttle shafts 112 desirably are linked together for uniform rotation. For this purpose, a coupler 128 connects together the adjacent ends of neighboring pairs of throttle shafts 112.

With reference to FIGS. 4 and 5, each coupler 128 is formed between a yoke 130 affixed to an end of a lower throttle shaft 112, which projects beyond the respective throttle body 108, and a contact arm or plate 132 affixed to the end plate 118 of the upper throttle shaft 112, which projects beyond the respective throttle body 108. The contact arms 132 are arranged to extend in a direction parallel to the common axis Z. The position of each contact plate 132, however, as best seen in FIG. 5, is offset from the common axis Z of the throttle shafts 112. Each yoke 130 is positioned about the corresponding contact arm 132 such that the arms 134 of the yoke 130 lie generally parallel to the contact arm 132. For this purpose, a base 136 of the yoke 130 extends well to one side of the common axis Z in order to offset the arms 134 of the yoke 130 from the axis Z.

As best seen in FIG. 4, a gap G exists between the end of the contact plate 132 and the base 136 of the yoke 130. The gap G is sufficiently sized to account for thermal expansion of the shafts 112. Under normal operating condition, axial expansion of the shafts 112 will cause the yoke 130 and contact plate 132 to move toward each other; however, the degree of such expansion is less than the designed gap spacing G. Consequently, the ends of the throttle shafts 112 do not contact each other even at elevated operating temperatures.

One arm 134 of each yoke includes a threaded hole. A screw 138 is threaded through the hole with a generally flat end 140 of the screw's shank contacting the contact arm 132. The screw 138 contacts the contact arm 132 on a first side. The screw desirably is generally centered on the contact plate 132, as appreciated from FIG. 5, so as to maintain contact with the plate 132 as the plate moves toward or away from the yoke 130 due to thermal expansion or contraction of the throttle shafts 112.

A compression spring 142 is located between the head 144 of the screw 138 and an outer surface of the yoke arm 134. The spring 142 eases adjustment of the screw 138, as well as inhibits movement of the screw 138 once set.

A second compression spring 146 is located within the yoke 130 between an inner surface of the yoke's other arm 134 and an opposite side of the contact arm 132 from that which the screw 138 contacts. The compression spring 146 is arranged to bias the contact arm 132 toward the screw 138.

The present coupler 128 provides a degree of angular adjustment between the throttle shafts 112 while linking the shafts 112. Movement of the set screw 138 causes movement of the contact arm 132 between the yoke arms 134, under either the force of the screw 138 or the force of the second compression spring 146. This movement of the contact arm 132, and thus, the offset end of the end plate 118, causes the end plate 118 and the affixed throttle shaft 112 to rotate about the common axis Z, with the end plate 118 acting as a lever. The yoke 130 and the lower throttle shaft 112 remain generally stationary such that the upper throttle shaft 112 rotates relative to the position of the lower throttle shaft 112. In this manner, the angular position of the throttle valves 110 within the respective throats 108b can be adjusted for synchronization.

As seen in FIGS. 2 and 3, a conventional bowden wire cable 148 connects to the lever 124 on the end of the lowermost throttle shaft 112. The bowden wire cable 148 couples the linkage, which is formed by the connected series of throttle shafts 112, to a throttle control mechanism in a known manner. As schematically illustrated in FIG. 2, actuation of the control mechanism operates the throttle linkage to control the throttle valves 110 of the throttle devices 100. Rotation of the lowermost throttle shaft 112 is imparted to the above throttle shaft 112 through the coupling 128. The coupling 128 directly transfers the rotation such that the throttle shafts 112 rotate together and to the same degree. The rotational movement is transferred throughout the linkage in this manner. As a result, the throttle shafts 112 simultaneously rotate to operate the throttle valves 110 in unison.

The induction system 14 also includes a fuel charger 150 to introduce fuel into the air charge, either directly into the combustion chamber 60, or into the air charge upstream of the intake passages 66 in the cylinder head 56. For instance, a carburetor, which incorporates the throttle device 100, can form the air/fuel charge. In the alternative, a fuel injector can inject fuel into the air steam through the throttle device 100, either upstream (i.e., indirect single point injection) or downstream (i.e., indirect multi-point injection) of the throttle valve 110. A suitable fuel supply system delivers fuel to the charge formers.

In the illustrated embodiment, as best seen in FIG. 3, each charge former 150 is a carburetor. The carburetor 150 has a generally conventional construction with a fuel bowl or float chamber 152 positioned below the venturi section 108a. A main spray nozzle 154 extends into the venturi section 108a to introduce fuel into the air flow through the venturi 108a and thus form a fuel/air charge. A flow axis through the spray nozzle 154 desirably lies generally parallel to the common axis Z of the throttle shafts 112. In the illustrated embodiment, each spray nozzle 154 also lies directly behind the corresponding throttle shaft 112. This orientation and position of the spray nozzle 154, coupled with the orientation of the corresponding throttle valve 110, promotes greater mixture of the fuel within the entire air stream, thereby producing a more homogenous fuel/air charge. Downstream of the charge former 150, the homogenous mixture distributes more evenly between the upper and lower branch passages 66b, 66c that in prior engine designs, as described more fully below.

The uniform spacing between the throttle valves 110 and the intake passages 66 within the cylinder block 46 produces induction paths of similar lengths and shapes for each cylinder 44 of the engine 12. The consistency between the cylinders 44 of the amount of air delivered to each cylinder 44 is consequently improved to enhance engine performance.

In addition, by rotating the throttle valves 110 about an axis Z parallel to the direction in which the branch passages diverge, the impact of any differential of the amount of air that passes on one side of the valve 110 verses the other side is minimized. Although more air flow may pass through one side of the valve 110 than the other, the larger air flow tends to divided generally equally at a divergence point 156 (FIG. 3) between the branch passages 66b, 66c. The amount of air flowing through one branch passage verses the other in any one cylinder does not substantially differ. A more consistent and uniform combustion consequently occurs with the respective cylinder.

The resulting throttle linkage created by the aligned throttle shafts 112 and couplers 128 also provides the ability to absorb thermal expansion of the throttle shafts 112 without producing rotation of the throttle valves 110. As a result, control of the throttle valves 110 at extremely lower or at elevated temperatures is enhanced for better engine performance.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. An engine for a marine drive comprising a plurality of throttle devices, each throttle device including an operator shaft to actuate the throttle device, the throttle devices being arranged within the engine to position the operator shafts in series along a common axis, and a linkage being formed by the series of operator shafts with the adjacent ends of neighboring pairs of operator shafts being connected by a coupler, each coupler being offset from the common axis and including a yoke affixed to an end of one of the adjacent throttle shaft ends and a contact plate affixed to the other adjacent end.

2. An engine as in claim 1, wherein said contact plate is positioned within the yoke and is movable therein to rotate the attached end relative to the adjacent end to which the yoke is attached.

3. An engine as in claim 2, wherein said coupler includes means for moving the contact plate within the yoke.

4. An engine as in claim 1, wherein each coupler includes means for adjusting a relative angular orientation between the pair of neighboring operator shafts which are coupled together by said coupler.

5. An engine as in claim 1 additionally comprising a plurality of variable-volume chambers, at least one movable member being mounted within each variable-volume chamber and being drivingly connected to an output shaft, said output shaft rotating about a rotational axis which generally lies parallel to the common axis of the operator shafts.

6. An engine as in claim 5 additionally comprising a plurality of intake passages, each throttle device communicating with one of the intake passages, each intake passage including a plurality of branch passages that communicate with a respective variable-volume chamber, the branch passages diverging from one another to increase the distance between the branch passages in a direction that is generally parallel to the rotational axis of the output shaft.

7. An engine as in claim 5, wherein the throttle devices are spaced apart from one another by a distance that generally matches the spacing between adjacent variable-volume chambers within the engine.

8. An engine as in claim 1, additionally comprising a plurality of cylinders, wherein at least one movable member is mounted within each cylinder and is drivingly connected to an output shaft, said output shaft rotates about a rotational axis, and each throttle device includes a throttle valve which rotates about an axis that is generally parallel to the rotational axis of the output shaft.

9. An engine as in claim 8 additionally comprising a plurality of intake passages, each throttle device communicating with one of the intake passages, each intake passage including a plurality of branch passages that communicate with a respective cylinder, the branch passages diverging from one another to increase the distance between the branch passages in a direction that is generally parallel to the rotational axis of the respective throttle valve.

10. An engine as in claim 9 additionally comprising a plurality of charge formers, each charge former being arranged to deliver fuel into the induction system upstream of the throttle device and along a delivery axis that is generally perpendicular to the rotational axis of the corresponding throttle valve.

11. An engine as in claim 10, wherein each charge former includes a delivery nozzle that is located directly behind the rotational axis of the respective throttle valve.

12. An engine as in claim 10, wherein each charge former is a carburetor.

13. An engine as in claim 8, wherein at least two throttle valves of the throttle devices rotate about a common axis.

14. An engine as in claim 13, wherein each throttle device includes a throttle shaft that rotates to operate the throttle valve, said throttle shafts being arranged in series along the common axis.

15. An engine as in claim 14, wherein a plurality of couplers interconnect adjacent ends of neighboring throttle shafts such that the throttle shafts rotate generally in unison.

16. An engine as in claim 1 for a marine drive comprising at least two cylinders being arranged such that axes of the two cylinders lie generally parallel to each other within generally the same plane, each throttle device communicating with one of the cylinders, the throttle devices being spaced apart from each other such that a pitch between the throttle devices substantially equals a pitch between the cylinder axes.

* * * * *